J. WALTON.
GEARING FOR LOCOMOTIVES.
APPLICATION FILED MAY 22, 1916.

1,252,519.

Patented Jan. 8, 1918.

Inventor
John Walton

Attorney

UNITED STATES PATENT OFFICE.

JOHN WALTON, OF ERIE, PENNSYLVANIA.

GEARING FOR LOCOMOTIVES.

1,252,519.

Specification of Letters Patent.

Patented Jan. 8, 1918.

Application filed May 22, 1916. Serial No. 99,018.

*To all whom it may concern:*

Be it known that I, JOHN WALTON, a citizen of the United States, residing at Erie, in the county of Erie and State of Pennsylvania, have invented new and useful Improvements in Gearings for Locomotives, of which the following is a specification.

This invention relates to gearings for locomotives and consists in certain improvements in the construction thereof as will be hereinafter fully described and pointed out in the claims.

In locomotives of some types a driving gear is mounted on a shaft having angular movement relatively to the axle or shaft which is driven and this causes a great deal of trouble in transmitting the movement from one gear to the other. The present invention is designed to obviate this difficulty.

The invention is illustrated in the accompanying drawings as follows:—

Figure 1:
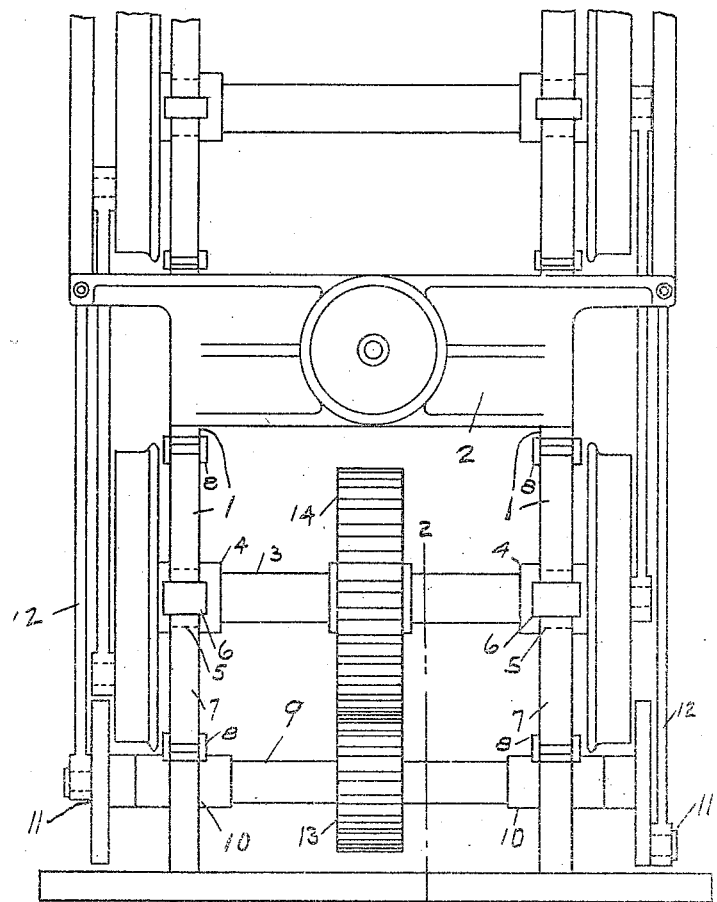

Figure 1 shows a plan view of a portion of an engine truck with the gearing in place thereon.

Figure 2:
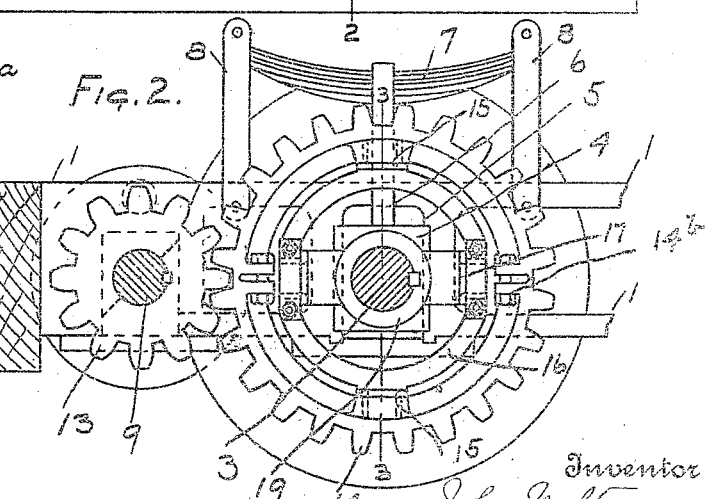

Fig. 2 a section on the line 2—2 in Fig. 1.

Figure 3:
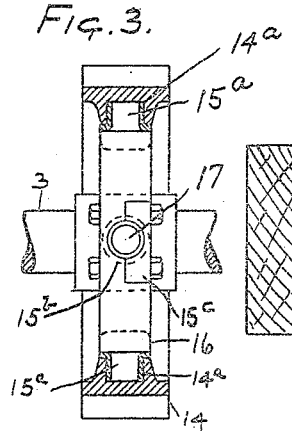

Fig. 3 a section of one of the gears on the line 3—3 in Fig. 2.

1 marks the sides of the engine truck and 2 the bolster. The axle 3 is journaled in bearings 4 and these bearings are slidingly mounted in the slots 5 in the truck sides. Thrust pins 6 extend upwardly from the bearings to the springs 7 and the ends of the springs are connected by links 8 with the truck sides.

The drive shaft 9 is carried in bearings 10 in the truck sides. Cranks 11 are arranged on the ends of the drive shaft 9 and these are connected by pitmen 12 with engines (not shown).

A gear 13 is fixed on the drive shaft and meshes a gear mounted on the axle. The gear on the axle is made up of the gear ring 14 which carries the teeth. This is connected by a pivotal joint 15 with the intermediate ring 16, the pivotal joint being made up of the pins 15ª extending from the intermediate ring into bearings 14ª in the gear ring. Preferably the gear ring 14 is split and connected by the bolts 14ᵇ. This permits the parts of the rings to be placed on the pins 15ª. The intermediate ring is mounted on the hub 19 by means of pivotal joints formed by the pins 17 extending from the hub into bearings 15ᵇ on the intermediate ring, these bearings having the removable plates 15ᶜ.

It will be readily seen that the intermediate ring with its pivotal bearings gives to the gear ring 14 angular freedom relatively to the axle 3. Consequently as the ends of the axle are moved unequally in the slot 5 the gear ring 14 is free to remain in alinement with the gear 13, so that there is a constant and free driving connection between the gears.

What I claim as new is:—

1. In a locomotive, the combination of a truck having slotted side frames; bearings in said slots; an axle arranged in said bearings; a drive shaft mounted in bearings in the side frames of the truck; a gear mounted on said drive shaft; and a gear mounted on the axle, the mounting of one of said gears comprising a joint permitting of angular freedom of the gear relatively to the shaft.

2. In a locomotive, the combination of a truck having slotted side frames; bearings in said slots; an axle arranged in said bearings; a drive shaft mounted in bearings in the side frames of the truck; a gear mounted on said drive shaft; and a gear mounted on the axle, one of said gears being formed with a gear ring; an intermediate ring; a hub; and pivotal connections between the intermediate ring and the gear ring and between the intermediate ring and the hub.

In testimony whereof I have hereunto set my hand.

JOHN WALTON.